US011896931B2

(12) United States Patent
Magazov et al.

(10) Patent No.: US 11,896,931 B2
(45) Date of Patent: Feb. 13, 2024

(54) MULTIVARIATE AUTOMATED CROSSFLOW FILTER CONTROL

(71) Applicant: The Automation Partnership (Cambridge) Limited, Royston (GB)

(72) Inventors: Salavat Magazov, Letchworth (GB); Martin Leuthold, Göttingen (DE)

(73) Assignee: The Automation Partnership (Cambridge) Limited

( * ) Notice: Subject to any disclaimer, the term of this patent is extended or adjusted under 35 U.S.C. 154(b) by 707 days.

(21) Appl. No.: 16/753,748

(22) PCT Filed: Oct. 5, 2018

(86) PCT No.: PCT/EP2018/077137
§ 371 (c)(1),
(2) Date: Apr. 3, 2020

(87) PCT Pub. No.: WO2019/068868
PCT Pub. Date: Apr. 11, 2019

(65) Prior Publication Data
US 2020/0276538 A1    Sep. 3, 2020

(30) Foreign Application Priority Data
Oct. 6, 2017    (EP) .................................... 17001648

(51) Int. Cl.
*B01D 61/22*    (2006.01)
*B01D 61/14*    (2006.01)
(Continued)

(52) U.S. Cl.
CPC ........... *B01D 61/22* (2013.01); *B01D 29/603* (2013.01); *B01D 29/606* (2013.01);
(Continued)

(58) Field of Classification Search
CPC .... B01D 61/22; B01D 29/603; B01D 29/606; B01D 37/043; B01D 37/046;
(Continued)

(56) References Cited

U.S. PATENT DOCUMENTS 6,375,847 B1    4/2002  Hartmann
2002/0043487 A1*  4/2002  Schick ................. B01D 61/145
                                                                        210/90

(Continued)

FOREIGN PATENT DOCUMENTS

JP        2014231053 A    12/2014
WO    WO 2017/144440 A2    8/2017
(Continued)

OTHER PUBLICATIONS

International Search Report and Written Opinion, dated Dec. 6, 2018, for International Application No. PCT/EP2018/077137, 9 pages.

*Primary Examiner* — Akash K Varma
(74) *Attorney, Agent, or Firm* — Klarquist Sparkman, LLP

(57) ABSTRACT

A control system and a control method for automated controlling of a crossflow filtration system, as well as a corresponding crossflow filtration system, are provided. The control system comprises a measurement value processing unit configured to receive a plurality of sensor signals from a plurality of sensors of the crossflow filtration system; and to determine a plurality of process parameters defining an operation state of the crossflow filtration system based on the plurality of sensor signals.

17 Claims, 4 Drawing Sheets

(51) Int. Cl.
 *B01D 61/18* (2006.01)
 *B01D 29/60* (2006.01)
 *B01D 37/04* (2006.01)

(52) U.S. Cl.
 CPC ......... *B01D 37/043* (2013.01); *B01D 37/046* (2013.01); *B01D 61/145* (2013.01); *B01D 61/147* (2013.01); *B01D 61/18* (2013.01); *B01D 2201/16* (2013.01); *B01D 2311/14* (2013.01); *B01D 2311/16* (2013.01); *B01D 2313/18* (2013.01); *B01D 2313/243* (2013.01); *B01D 2315/10* (2013.01); *B01D 2315/16* (2013.01)

(58) Field of Classification Search
 CPC .... B01D 61/145; B01D 61/147; B01D 61/18; B01D 2201/16; B01D 2311/14; B01D 2311/16; B01D 2313/18; B01D 2313/243; B01D 2315/10; B01D 2315/16
 USPC ........................................................ 210/137
 See application file for complete search history.

(56) References Cited

U.S. PATENT DOCUMENTS

| | | |
|---|---|---|
| 2003/0116487 A1 | 6/2003 | Petersen |
| 2006/0027500 A1 | 2/2006 | Schick |
| 2008/0237142 A1 | 10/2008 | Carpenter et al. |
| 2011/0278208 A1* | 11/2011 | Namba ................. B01D 61/06 210/88 |

FOREIGN PATENT DOCUMENTS

| | | |
|---|---|---|
| WO | WO 2017/160739 A1 | 9/2017 |
| WO | WO 2018/138160 A1 | 8/2018 |

* cited by examiner

MULTIVARIATE AUTOMATED CROSSFLOW FILTER CONTROL

CROSS REFERENCE TO RELATED APPLICATIONS

This is the U.S. National Stage of International Application No. PCT/EP2018/077137, filed Oct. 5, 2018, which was published in English under PCT Article 21(2), which in turn claims the benefit of European Patent Application No. 17 001 648.9, filed Oct. 6, 2017. The prior applications are incorporated herein by reference in their entirety.

The present invention relates to an improved control of crossflow filtration (CFF). More specifically, a system and a method for multivariate, multimode control of crossflow filtration is provided that allows an improved flexibility of automated control of pressures and flows. It specifically may improve overpressure prevention.

Crossflow filtration is a commonly used filtering process in which feed flows substantially parallel to a membrane surface, thereby preventing accumulation of build-up on the membrane. Filter cake formation, which is usual for dead-end filtration, does not occur in crossflow filtration processes. A fraction of the feed passes through the membrane, which is called permeate. The fraction that does not pass through the membrane is called retentate. During the crossflow filtration process the retentate is being recirculated, i.e. directed again across the membrane surface. The desired end product may be contained in the permeate and/or retentate.

The crossflow filtration technology can be applied very widely to process, e. g., fluids, emulsions, suspensions, beverages, such as water, juice, beer, wine, whey, milk, sewage and solutions, e.g., for biotechnological, pharmaceutical, biopharmaceutical, biogenetic, medical, chemical, cosmetic and laboratory applications.

Manual control of flow rate and pressure inside the crossflow filter lacks accuracy and repeatability. Certain control modes that might be beneficial are not possible or require unreasonable human involvement with manual control. Existing overpressure prevention solutions such as relief valves cause loss of material and may cause damage to system components and operator.

Accordingly, it is an object of the present invention to provide a crossflow filtration system that enables a multivariate automated control system.

The above object is solved by the subject-matter of the independent claims. Preferred embodiments are defined in the dependent claims.

According to one aspect of the present invention, a control system for automated controlling of a crossflow filtration (CFF) system is provided, comprising:
  a measurement value processing unit configured to
    receive a plurality of sensor signals from a plurality of sensors of the crossflow filtration system; and
    determine a plurality of process parameters defining an operation state of the crossflow filtration system based on the plurality of sensor signals;
  a control mode selection unit configured to
    determine based on a user input a subset of the process parameters as a set of control parameters; and
    determine for each control parameter in the set of control parameters a corresponding set value (target value); and
  a control unit comprising a plurality of control loop modules, each control loop module being configured to receive at least one control parameter from the set of control parameters;
    determine a control deviation of the received control parameter from the corresponding set value; and
    provide an actuating signal to a dedicated actuator of the crossflow filtration system suitable to change the operation state of the crossflow filtration system such as to reduce the determined control deviation.

The set of control parameters may define a control mode. Thus, a control mode may be defined by a set of control parameters, wherein each control parameter is a process parameter received from the measurement value processing unit. The control mode selection unit may have a plurality of predefined control modes stored in a respective memory for a user to select one out of the plurality of predefined control modes. In one aspect, the user may select the control mode without selecting individual process parameters. Alternatively or additionally, the user can individually select the desired process parameter, thereby determining the control mode to be applied. Regardless of the way how the control mode is selected/determined, the control unit is configured to operate in the selected/determined control mode.

The control system may be applied to any CFF system, e.g., CFF systems designed for microfiltration, ultrafiltration, nanofiltration, pervaporation and/or reverse osmosis applications. The control system may further control CFF systems for the filtration of solid and/or gaseous materials.

In the context of the present invention, a CFF system comprises all members that are involved in a CFF process. The design of such a CFF system is not limited, in particular with respect to the type, number and arrangement of members, and the flow circuitry that is built by fluidically coupling members to a CFF system. An exemplary CFF system may comprise, e.g., a filtration module (also referred to as filter), comprising one or more filter media, such as a metal, ceramic and/or polymer membrane, at least one feed inlet, at least one permeate outlet, at least one retentate outlet; a retentate vessel comprising at least one inlet and at least one outlet. A flow circuitry is built by fluidically coupling members of the exemplary CFF system. In particular, the feed inlet is fluidically coupled to an outlet of the retentate vessel by a feed conduit. The retentate outlet is fluidically coupled to an inlet of the retentate vessel by a retentate conduit. In other words conduits provide fluid communication between the inlet and outlet of the filtration module, thereby forming a circulation loop. The exemplary CFF system may comprise more than one circulation loop, wherein each loop may comprise reservoirs. Further conduits may be arranged so as to return permeate into the circulation loop and/or to add buffer solution into the flow circuitry. Additional reject conduits may be fluidically coupled at arbitrary positions to the circulation loop(s) for enabling reject of media flowing within the circulation loop(s). A plurality of pumps may be used so as to enable fluid transport at specific flow rates within the internal volumes, i.e. conduits of the exemplary CFF system. Valves may be arranged in the flow circuitry to selectively regulate the fluid flow within internal volumes of the filtration system. Valves may also be positioned such that fluid can be added or extracted from internal volumes of the exemplary CFF system. Particularly, valves for regulating the retentate and permeate streams may be arranged in the exemplary CFF system. Sensors may be utilized in order to measure quantities such as system pressures and/or flow rates at various positions within the internal volumes.

The control system comprises a measurement value processing unit that may be electrically coupled to a plurality of sensors of a CFF system in order to receive from each sensor a sensor signal. The measurement value processing unit preferably receives each sensor signal by means of analog-digital conversion. In other words, the each analog sensor signal may be digitalized by discretization and quantization of one or more analog-digital converters that are part of the measurement value processing unit. The measurement value processing unit is capable of providing a plurality of process parameters that are preferably deduced from the plurality of sensor signals. The plurality of process parameters may comprise raw and/or filtered sensor signals, as direct process parameters, and/or derived process parameters being derived from two or more direct process parameters. A filtered sensor signal is obtained by processing a raw sensor signal with one or more data filtering methods, such as low-pass, high-pass, band-pass, band-stop, band-reject and/or notch filtering. Data filtering may be applied in order to manipulate the received sensor signals in a predefined manner, for example by reason of noise reduction.

The plurality of process parameters defines an operation state of the CFF system. The operation state may be characterized in that each process parameters is defined by a specific magnitude. The control system may continuously inform the user of the operation state, particularly if one or more process parameters exceed a critical magnitude.

A control mode selection unit is capable of determining a control mode. A control mode is defined by a set of control parameters that are received from the measurement value processing unit. The determination of the control mode requires a user input. Preferably the control parameters comprise at least one control parameter for a feed pump control loop and/or at least one for a retentate valve control loop and/or at least one for a permeate valve control loop. Depending on which control parameters are selected, the control mode changes. The control mode selection unit receives based on the control mode determination the respective process parameter to be controlled. In other words, the control parameters are process parameters to be controlled based on a user's choice. It may be possible that the user choses the control parameters to define the control mode or alternatively the user choses a predefined control mode thereby selecting a predefined set of control parameters. For each control parameter a set value is determined, preferably by user input. The set values may also be predefined as default values in the control system.

The control system further comprises a control unit that is configured to operate in the determined control mode. The control unit comprises a plurality of primary control loops that are capable of controlling one control parameter to the corresponding set value. For example, any deviations between the instantaneous value of the control parameter and its corresponding set value may be reduced to zero by the respective primary control loop. In order to achieve the desired set value each primary control loop is capable of providing a control input signal to an actuator that may maintain and/or change the operation state of the controlled CFF system. Control input signals may result in control actions that cause specific actor justifications. For example, if the actuator is a pump, the control action may influence the pumping rate, or if the actuator is a valve, the control action may influence the flow rate through an internal volume of the CFF system. Control actions may have direct or indirect influence on the operation state, i.e. pressures and flow rates within the CFF system may be maintained and/or changed by control actions. Each primary control loop is preferably a closed control loop whose control input signal is dependent on feed back from the control parameter, i.e. the process parameter to be controlled by the respective primary control loop.

The measurement value processing unit and/or control mode selection unit and/or control unit may be one or more computer implemented programs to be executed on one or more central processing units (CPU) that may acquire and write out data. Additionally, the units may communicate with each other in order to exchange necessary data, in particular with respect to the process parameters, the control mode, the control parameters and the set values.

Advantageously a control system is provided that enables fully automated CFF process control and a maximum of flexibility regarding the desired control variables. Therefore, CFF systems can be controlled in control modes that have not yet been accessible in conventional control systems. In addition, full automatization of CFF process control enables repeatable operation and smooth transition of the control variables without pressure or flow spikes within the CFF circuitry. As the control mode and therefore the control variables can be changed, the system provides multiple reconfigurable control loops. The invention obviates the need for relieve valves to adjust pressure. Accordingly, there is no loss of material within the CFF circuitry.

Preferably, each primary control loop comprises at least one PID controller. A PID controller may continuously calculate an error value e as the deviation between the set point and the control parameter and apply a correction based on proportional, integral, and derivative terms in order to reduce the deviation to zero. In the present case, the correction represents a control input signal for an actuator of the CFF system. Advantageously, PID controller enable accurate and responsive closed-loop control.

Preferably, the plurality of sensor signals comprises
a feed pressure signal ($P_f$) indicating a pressure in a feed stream of the crossflow filtration system; and/or
a retentate pressure signal ($P_r$) indicating a pressure in a retentate stream of the crossflow filtration system; and/or
a permeate pressure signal ($P_p$) indicating a pressure in a permeate stream of the crossflow filtration system; and/or
a weight signal ($M_r$) indicating a mass of a retentate vessel of the crossflow filtration system; and/or
a flow signal of a feed flow of the crossflow filtration system.

Most preferably, the plurality of sensor signals comprises $P_f$, $P_r$, $P_p$ and $M_r$.

Preferably, the plurality of process parameters comprises
(filtered) sensor signals; and/or
a transmembrane pressure (TMP) (of a filter) of the crossflow filtration system; and/or
a pressure difference ($\Delta P$) between a feed pressure ($P_f$), indicating a pressure in a feed stream of the crossflow filtration system, and a retentate pressure ($P_r$), indicating a pressure in a retentate stream of the crossflow filtration system; and/or
a permeate flow rate of the crossflow filtration system.

Advantageously, the control system has access to important or desired quantities to describe the operation state of the CFF system. The process parameters may comprise raw or filtered sensor signals of $P_f$ and/or $P_r$ and/or $P_p$ and/or $M_r$. These sensor signals, either raw or filtered, may be regarded as direct process parameters as they can be measured directly in the CFF system.

Preferably, the plurality of process parameters comprises a transmembrane pressure TMP of the filter of the CFF system, and/or a pressure difference $\Delta P$ between the pressure of a feed and retentate stream of the CFF system, and/or a permeate flow rate of the crossflow filtration system.

The transmembrane pressure TMP describes the pressure gradient between the retentate side and permeate side of a filter membrane. TMP determines a force for transition of material through the membrane. The control system preferably calculates TMP using the following equation:

$$TMP = \frac{P_f + P_r}{2} - P_p$$

ΔP describes the pressure gradient between the feed and retentate stream, i.e. between a feed inlet of a filter and a retentate outlet of a filter. The control system preferably calculates ΔP using the following equation:

$$\Delta P = P_f - P_r$$

The permeate flow rate F, also know as flux F, describes the flow rate through the membrane of a filter. The control system may calculate flux using the following equation:

$$F = L - \frac{dM}{dt} * \frac{1}{\rho}$$

$F$: permeate flow rate $L$: L-flow rate $M$: retentate mass $t$: time $\rho$: retentate density L-flow rate represents a flow rate of a buffer fluid that is added to the flow circuitry of the CFF system. M represents the mass of a retentate vessel of the CFF system. L may be set to zero, if no diafiltration buffer is added to the retentate, e.g. if the CFF system is not (used as) a diafiltration system.

TMP, ΔP and flux may be regarded as derived process parameters as they can be calculated from direct process parameters.

Advantageously, the control system has access to further variables that describe further essential process parameters, which can be used as control parameters in the primary control loops.

Preferably, the plurality of primary control loops comprises at least a feed pump control loop configured to provide a control input signal for a feed pump actuator of the CFF system and/or, a retentate valve control loop configured to provide a control input signal for a retentate valve actuator of the CFF system, and/or, a permeate valve control loop configured to provide a control input signal for a permeate valve actuator of the CFF system.

Advantageously, each actuator can be independently controlled and the operation state of the CFF system may be regulated with a minimum of actuators. In particular, the feed pump control loop may provide a control signal for the feed pump resulting in a specific feed pumping rate. The retentate control loop may provide a control signal for the retentate valve resulting in a specific flow rate through the retentate valve. The permeate control loop may provide a control signal for the permeate valve resulting in a specific flow rate through the permeate valve.

Preferably, the feed pump control loop is configured to selectively control one of the control parameters $P_f$ or ΔP or TMP, or constant pumping rate; the retentate valve control loop is configured to selectively control one of the control parameters $P_r$ or TMP, or constant position; and the permeate valve control loop is configured to selectively control one of the control parameters $P_p$ or TMP or permeate flow rate, or constant position.

More specifically, in one aspect, the plurality of control loop modules may comprise a feed pump control loop configured to provide a feed pump actuating signal for a feed pump actuator of the crossflow filtration system to change/adapt a power/flow rate of the feed pump. In this aspect the control mode selection unit is preferably configured to selectively provide as control parameter to the feed pump control loop:

a feed pressure signal ($P_f$) indicating a pressure in a feed stream of the crossflow filtration system; and/or a pressure difference (ΔP) between a feed pressure ($P_f$), indicating a pressure in a feed stream of the crossflow filtration system, and a retentate pressure ($P_r$), indicating a pressure in a retentate stream of the crossflow filtration system; and/or a transmembrane pressure (TMP) of the crossflow filtration system.

In another aspect, which is preferably combined with one or more of the previously described aspects, the plurality of control loop modules may comprise a retentate valve control loop configured to provide a retentate valve actuating signal for a retentate valve actuator of the crossflow filtration system to change/adapt an opening state of the retentate valve. In this aspect the control mode selection unit is preferably configured to selectively provide as control parameter to the retentate valve control loop:

a retentate pressure signal ($P_r$) indicating a pressure in a retentate stream of the crossflow filtration system; and/or a transmembrane pressure (TMP) of the crossflow filtration system; and/or a feed pressure signal ($P_f$) indicating a pressure in a feed stream of the crossflow filtration system.

In yet another aspect, which is preferably combined with one or more of the previously described aspects, the plurality of control loop modules may comprise a permeate valve control loop configured to provide a permeate valve actuating signal for a permeate valve actuator of the crossflow filtration system to change/adapt an opening state of the permeate valve. In this aspect, the control mode selection unit is preferably configured to selectively provide as control parameter to the permeate valve control loop:

a permeate pressure signal ($P_p$) indicating a pressure in a permeate stream of the crossflow filtration system; and/or a transmembrane pressure (TMP) of the crossflow filtration system; and/or a permeate flow rate (F), indicating a flow rate through the filter membrane of the crossflow filtration system.

In any of these aspects, as will be described also further below, a fixed operation state of one or more of the actuators may be provided as a process parameter or instead of the process parameters that are derived from the sensor signals.

Preferably one or more of the control loop modules comprises at least one PID controller.

Advantageously, it may be possible that each actuator controls a single process parameter (direct or derived process parameter) without assistance from other actuators. At the same time various combinations of control parameters may be used to control the CFF system. Each combination may represent a specific control mode as shown in the following table:

TABLE 1

Control modes

| | | Control parameter for permeate valve control loop | Control parameter for feed pump control loop | | | |
|---|---|---|---|---|---|---|
| | | | Constant flow (rate) | $P_f$ | $\Delta P$ | TMP |
| Control parameter for Retentate Valve control loop | Constant position | Constant position | X | X | X | X |
| | | $P_p$ | X | X | X | X |
| | | TMP | X | X | X | |
| | | Flux | X | X | X | X |
| | $P_r$ | Constant position | X | X | X | X |
| | | $P_p$ | X | X | X | X |
| | | TMP | X | X | X | |
| | | Flux | X | X | X | |
| | TMP | Constant position | X | X | X | |
| | | $P_p$ | | | | |
| | | TMP | | | | |
| | | Flux | X | | | |
| | $P_f$ | Constant position | X | | X | X |
| | | $P_p$ | X | | X | |
| | | TMP | X | | X | |
| | | Flux | X | | X | |

Control modes marked with an X are preferred control modes most suitable for the control system.

Preferably, the control system further provides a $P_f$ overpressure prevention function. $P_f$ overpressure (also referred to as feed overpressure) occurs when the magnitude of $P_f$ exceeds a certain limit. The $P_f$ limit may be a predefined default value and/or determined by user input. In another implementation, the $P_f$ limit (also referred to as secondary set value in the following) may be a value automatically determined by the control system by observing the behaviour of the crossflow filtration system. $P_f$ overpressure may be detrimental to the filter and the fluid in the CFF system. Preferably, the $P_f$ overpressure prevention function is a computer implemented routine that can be activated and/or deactivated by a user and/or which is automatically activated and/or deactivated depending on a selected control mode.

In a specifically preferred embodiment, the control system is adapted for automated controlling of a multi-channel crossflow filtration system that comprises multiple filtration modules (filters) operable in parallel and operable at least partly independent from each other. Specifically each of the filters may comprise at least one feed inlet, at least one permeate inlet and at least one retentate outlet. In one embodiment the multi-channel crossflow filtration system may comprise multiple circulation loops that are separate from each other and that are separately operable, e.g. with regards to operation of pumps and valves, specifically such that there is no (direct and/or indirect) fluid coupling/connection between the circulation loops. Each of the multiple circulation loops may comprise at least one of the multiple filtration modules. Thus, in this embodiment, the individual filtration channels may operate in parallel but (at least partly) independent from each other. For example, even when the same substrates are subject of the filtration in the different filtrations channels, the filtration processes in the different filtration channels can be started at different times and/or carried out with different filtration parameter, such as different feed pressures and/or different permeate pressures and/or different retentate pressures and/or different flow rates, etc. Most preferably in this arrangement, the overpressure prevention function (a preferred implementation is described in more detail further below) may be activated and operating independently in each of the filtration channels (i.e. in each filter). Specifically, the $P_f$ limit may be determined separately for each filtration channel, even in cases where the filtration channels have the same dimensions and are used for filtrating identical substrates.

Even though in one implementation the individual filtration channels (i.e. circulation loops) in the multi-channel filtration system can be implemented independent from each other, in another embodiment the circulation loops may share part of the components, such as a retentate vessel, one or more reservoirs, etc. Most preferably, the channels have at least separately controllable filtration modules and feed pumps, in order to allow a separate control and prevention of overpressure conditions.

Specifically, for such multi-channel crossflow filtration system it is particularly advantageous if, according to a preferred embodiment, the control system is adapted to automatically determine and set the $P_f$ limit (and/or another secondary set value) for one or more of the filtration channels based on an observed behaviour of one or more other filtration channels of the crossflow filtration system. Thus, the one or more filtration channels can learn from the experience made with poor process conditions in the one or more other filtration channels in order to improve the process conditions. Based on that control mode, the filtration channel, where the poor process conditions (overpressure condition) are observed thus operates as a forerunner channel to influence the conditions in one or more other channels that may also be called follower channels.

The "forerunner/follower" terminology is used herein just for reasons of nomenclature to assign roles regarding the overpressure prevention functionality so the various filtration channels without necessarily any additional technical limitations. For example, all filtration channels can be equipped analogous and the role as "forerunner" or "follower" may just be defined based on which channel was started first. In one embodiment, the channels may be operated/started simultaneously (with the same or alternative control/process parameters) and the may all be observed with regards to the occurrence of an overpressure condition. Thus, their role as forerunner or follower can change over time. Alternatively, the CFF system can comprise one or more dedicated forerunner channels and one or more dedicated follower channels.

According to a preferred embodiment, one or more of the following conditions are observed in one or more filtration channel (forerunner channel) and taken into account for determining and/or adapting the $P_f$ limit for one or more other filtration channels (follower channel):

occurrence of filter blockage and/or exceeding of a predetermined level of cloudiness of the substrate (e.g. the retentate and/or the permeate) and/or exceeding a predetermined amount of buffer consumption and/or exceeding a predetermined process time.

For example, it turned out that filter blockage is often an irreversible condition, where the filter membrane cannot be (fully) recovered even by drastically changing the process parameters (e.g. flow rates and/or transmembrane pressure). It has also turned out that $P_f$ overpressure can be significant factor for filter blockage. Other possible consequences of $P_f$ overpressure may be one or more of the above mentioned conditions of exceeding of a predetermined level of cloudiness of the substrate and/or exceeding a predetermined amount of buffer consumption and/or exceeding a predetermined process time. Thus, each of these conditions may be considered as a $P_f$ overpressure condition.

For example depending on the control mode, the control system may be adapted to set and/or change the $P_f$ limit for at least one follower filtration channel to a specific value, which may be lower than the respectively set value of the $P_f$ limit in the forerunner filtration channel where the mentioned condition was observed or lower than a maximum value of $P_f$ that was observed in that forerunner filtration channel shortly before or at the time when the overpressure condition was observed. Thus, the follower filtration channel can learn from the experience made with poor process conditions in order to improve the process conditions, specifically with regards to the occurrence of a ($P_f$) overpressure. For the purpose of automatically determining the $P_f$ limit for one or more of the filtration channels based on observations of malfunction (e.g. observations of one or more of the above mentioned conditions) in one or more other filtrations channels, the control system may comprise a pressure limit adaption module implementing predetermined adaption rules for determining/setting the new/modified $P_f$ limit (and or any other secondary set value) based on the observed condition and based on the existing $P_f$ limit (secondary set value) and/or an observed maximum value of $P_f$ in the filtration channel where the malfunction was observed. For example, the new/modified $P_f$ limit may be set to a value that is lower than the $P_f$ limit in the filtration channel with the malfunction (e.g. by a predetermined difference depending on the type and/or degree of malfunction).

Preferably, to provide the $P_f$ overpressure prevention function, the control system comprises a (first) secondary control loop that preferably controls a virtual feed pump, wherein the (first) secondary control loop is operated in a calculated maximum $P_f$ and a user-defined set value for a $P_f$ pressure limit.

The secondary control loop takes real values from the $P_f$ sensor signal, preferably local maxima of the $P_f$ sensor signal and the $P_f$ limit as input parameters and preferably creates an output of a virtual pumping rate indicating how fast the real feed pump would have to pump to create the maximum allowed pressure $P_f$. In normal operating mode, i.e. if no feed overpressure occurs, the virtual pumping rate is much higher than the real pumping rate. If the feed overpressure condition is met, i.e. if exceeding the $P_f$ limit, the virtual pumping rate preferably starts approaching the real pumping rate. If the feed overpressure condition persists, the virtual flow rate preferably drops below the current real pumping rate set value. Once that happens, the virtual pumping rate preferably limits the real pumping rate in order decrease $P_f$.

Preferably, the (first) secondary control loop comprises a PID controller. Advantageously, a PID controller enables an accurate and responsive closed-loop control.

Preferably, in addition or alternative, the control system further provides a $P_r$ overpressure prevention function. $P_r$ overpressure (also referred to as reverse overpressure) occurs when the magnitude of $P_r$ drops below the magnitude of $P_p$, i.e. when the magnitude of $P_p$-$P_r$ exceeds a certain limit. The $P_p$-$P_r$ limit (also referred to as secondary set value in the following) may be a predefined default value and/or determined by user input. In another implementation, the $P_p$-$P_r$ limit may be a value automatically determined by the control system by observing the behaviour of the crossflow filtration system. Reverse overpressure may be detrimental to the filter and the fluid in the CFF system. Preferably, the $P_r$ overpressure prevention function is a computer implemented routine that can be activated and/or deactivated by a user and/or which is automatically activated and/or deactivated depending on a selected control mode.

Preferably, to provide the $P_r$ overpressure prevention function the control system comprises a (second) secondary control loop, wherein the (second) secondary control loop is preferably operated in a calculated minimum $P_r$.

The (second) secondary control loop preferably controls a virtual feed pump and takes real values from the $P_r$ sensor signal and the $P_p$ sensor signal, preferably local maxima of the difference between the $P_p$ sensor signal and the $P_r$ sensor signal as input parameters and preferably creates an output for the feed pump as a virtual pumping rate indicating how fast the real feed pump would have to pump to create the maximum allowed pressure difference. In normal operating mode, i.e. if no reverse overpressure occurs, the virtual pumping rate may be much higher than the real pumping rate. If the reverse overpressure condition is met, the virtual pumping rate preferably starts approaching the real pumping rate. If the reverse overpressure condition persists, the virtual flow rate preferably drops below the current real pumping rate set value. Once that happens, the virtual pumping rate preferably limits the real pumping rate.

Preferably, the (second) secondary control loop comprises a PID controller. Advantageously, a PID controller enables an accurate and responsive closed-loop control.

Analogous to the $P_f$ limit (as secondary set value) as described in connection with the $P_f$ overpressure, the $P_p$-$P_r$ limit may be determined (as secondary set value) by the control system in a multi-channel filtration systems depending on observations of malfunctions in one or more of the filtration channels of the multiple filtration channels. For the $P_r$ overpressure prevention function, the conditions for observing a malfunction (overpressure condition) in one or more of the filtration channels may be selected from the same group of observations as described above. However, in any case the conditions may be selected independently from the conditions selected for the $P_f$ overpressure prevention function, e.g. if a $P_f$ overpressure prevention function and a $P_r$ overpressure prevention function are provided simultaneously. Once an overpressure condition (i.e. malfunction)

is observed, the determination of the $P_p$–$P_r$ limit (secondary set value) may be performed analogous to the determination of the $P_f$ limit as described above. Therefore, it is refrained from repeating the analogous explanations. Also the advantages of this implementation due to learning from the experience made with poor process conditions in order to improve the process conditions, specifically with regards to the occurrence of a $P_r$ overpressure condition, become apparent from this description.

Thus, more generally, in one aspect, the measurement value processing unit is preferably configured to
- receive at least one pressure signal ($P_f$; $P_r$; $P_p$), indicating a pressure in a fluid stream of the crossflow filtration system, preferably a feed pressure signal ($P_f$) and/or a retentate pressure signal ($P_r$) and/or a permeate pressure signal ($P_p$);
- determine at least one overpressure prevention signal from the at least one received pressure signal, preferably the feed pressure signal ($P_f$) and/or a pressure difference between the permeate pressure signal and the retentate pressure signal; and
- determine local maxima in the at least one overpressure prevention signal, In this aspect, the control mode selection unit is preferably configured to
- determine the feed pressure signal ($P_f$) and/or the pressure difference ($\Delta P$) between the feed pressure signal (Pt) and the retentate pressure signal ($P_r$) and/or a transmembrane pressure (TMP) of the crossflow filtration system as a primary control parameter (the determination depends on the user selection of the respective parameter and/or the selected control mode);
- determine the local maxima in the at least one overpressure prevention signal as at least one secondary control parameter; and
- determine a primary set value and at least one secondary set value for the primary control parameter and the secondary control parameter, respectively.

Moreover, in this aspect, the control unit preferably comprises a feed pump control loop module comprising
- a primary feed pump control loop configured to
  - receive the primary control parameter;
  - determine a primary control deviation of the received primary control parameter from the primary set value; and
  - provide a primary feed pump actuating signal suitable for a feed pump actuator to change the operation of a feed pump of the crossflow filtration system such as to reduce the determined primary control deviation. This primary feed pump control loop may be implemented or represented as any one of the feed pump control loops described herein.

Moreover, the feed pump control loop module preferably further comprises at least one secondary feed pump control loop configured to
- receive the at least one secondary control parameter;
- determine at least one secondary control deviation of the received at least one secondary control parameter from the at least one secondary set value; and
- provide at least one secondary feed pump actuating signal suitable for the feed pump actuator to change the operation of a feed pump of the crossflow filtration system such as to reduce the determined at least one secondary control deviation.

Furthermore, in this aspect, the control unit preferably comprises an overpressure prevention unit configured to selectively feed the primary feed pump actuating signal or the at least one secondary feed pump actuating signal to the feed pump actuator depending on which one corresponds to a lower or lowest feed flow (rate), i.e. a lower/lowest flow rate of the feed fluid in the feed channel.

Thus, in this respect, when overpressure condition occurs, the feed pressure may be substantially constant (at or close to the maximum pressure), but the flow rates requested by the control loops may be different, and the selection is based on which control loop is asking for lower flow rate. If multiple overpressure prevention signals and respective secondary control parameters, secondary set values, secondary feed pump control loops, secondary control deviations, and secondary feed pump actuating signals are implemented, the feed overpressure prevention unit may select that signal out of the primary feed pump actuating signal and the multiple secondary feed pump actuating signals that corresponds to the lowest feed flow rate.

In one preferred embodiment, the feed pressure signal may be determined as the (first) overpressure prevention signal. Thus, in this embodiment, the measurement value processing unit is preferably configured to receive a feed pressure signal ($P_f$), indicating a pressure in a feed stream of the crossflow filtration system; and determine local maxima in the received feed pressure signal. The control mode selection unit is preferably configured to determine the determined local maxima in the feed pressure signal as (first) secondary control parameters; and determine a (preferably predetermined, e.g. system specific) maximum feed pressure value as corresponding secondary set value. The primary control parameter and the corresponding primary set value may be determined depending on the selected control mode. In a preferred implementation, the feed pressure (signal) is determined as the primary control parameter and a (preferably user selected) desired feed pressure value may be determined as the corresponding primary set value.

Moreover, in this implementation it is further preferred, that the secondary feed pump control loop is configured to
- receive the determined local maximal in the feed pressure signal as the secondary control parameter;
- determine the secondary control deviation of the received local maxima in the feed pressure signal from the maximum feed pressure value; and
- provide the secondary feed pump actuating signal suitable for the feed pump actuator to change the operation of the feed pump of the crossflow filtration system such as to reduce the determined secondary control deviation.

In a preferred operation mode of the system, the primary feed pump control loop may be configured to
- receive the feed pressure signal as a primary control parameter;
- determine a primary control deviation of the received feed pressure signal from the desired feed pressure value; and
- provide a primary feed pump actuating signal suitable for a feed pump actuator to change the operation of a feed pump of the crossflow filtration system such as to reduce the determined primary control deviation.

In another preferred embodiment that is most preferably even combined with the previous described preferred embodiment, the pressure difference between the permeate pressure (signal) and the retentate pressure (signal) may be determined as the (second) overpressure prevention signal. Thus, in this embodiment, the measurement value processing unit is preferably configured to receive a retentate pressure signal ($P_r$), indicating a pressure in a retentate stream of the crossflow filtration system, and a permeate pressure signal ($P_r$), indicating a pressure in a permeate stream of the crossflow filtration system; and determine local maxima in the pressure difference between the permeate pressure (signal) and the retentate pressure (signal). The control mode selection unit is preferably configured to determine the determined local maxima in said pressure difference as (second) secondary control parameters; and determine a (preferably predetermined, e.g. system specific) maximum pressure difference value as corresponding (second) secondary set value. The primary control parameter and the corresponding primary set value may be determined depending on the selected control mode. In a preferred implementation, the feed pressure (signal) or TMP is determined as the primary control parameter and a (preferably user selected) desired feed pressure value (or TMP value) may be determined as the corresponding primary set value.

Moreover, in this implementation it is further preferred, that the secondary feed pump control loop (which may be a second secondary feed pump control loop) is configured to
  receive the determined local maximal in the pressure difference (signal) between the permeate pressure (signal) and the retentate pressure (signal) as the (second) secondary control parameter;
  determine the secondary control deviation (which may be a second secondary control deviation) of the received local maxima in said pressure difference signal from the maximum pressure difference value; and
  provide the secondary feed pump actuating signal (which may be a second secondary feed pump actuating signal) suitable for the feed pump actuator to change the operation of the feed pump of the crossflow filtration system such as to reduce the determined (second) secondary control deviation.

Thereby, a very efficient overpressure protection is provided. In this aspect, it is most preferred that the primary feed pump control loop and the secondary feed pump control loop each comprises a PID controller, which both have the same PID-parameters. This makes both the configuration and the operation of the overpressure prevention easy to handle and reliably in operation. The described overpressure protections for the feed pressure and the pressure difference between the permeate pressure and the retentate pressure may be implemented and/or activated alternatively or in combination.

Preferably the control system is adapted for automated controlling of a multi-channel crossflow filtration system, wherein the control mode selection unit is configured to receive an overpressure condition in a forerunner filtration channel of the multi-channel crossflow filtration system, and to determine the at least one secondary set value for a follower filtration channel of the multi-channel crossflow filtration system.

In another aspect, the present invention provides a crossflow filtration system, comprising
  a feed pump as an actuator to provide fluid through a feed channel to a filter of the crossflow filtration system, wherein a feed pressure sensor is provided to measure a fluid pressure in the feed channel;
  a retentate valve as an actuator to control flow of retentate fluid through a retentate channel from the filter of the crossflow filtration system, where a retentate pressure sensor is provided to measure a fluid pressure in the retentate channel;
  a permeate valve as an actuator to control flow of permeate fluid through a permeate channel from the filter of the crossflow filtration system, where a permate pressure sensor is provided to measure a fluid pressure in the permeate channel; and
  a control system as described herein preferably in accordance with one of the described preferred embodiments of the invention.

In a preferred aspect, the CFF system further comprises a weight sensor to measure a weight or mass of a retentate vessel of the crossflow filtration system.

In yet another aspect, the invention provides an automated (partially of fully computer-implemented) control method for automated controlling of a crossflow filtration system, comprising:
  receiving (at a measurement value processing unit) a plurality of sensor signals from a plurality of sensors of the crossflow filtration system;
  determining a plurality of process parameters defining an operation state of the crossflow filtration system based on the plurality of sensor signals;
  determining based on a user input a subset of the process parameters as a set of control parameters;
  determining for each control parameter in the set of control parameters a corresponding set value (target value);
  determining for each control parameter a control deviation of the control parameter from the corresponding set value; and
  providing an actuating signal to a dedicated actuator of the crossflow filtration system suitable to change the operation state of the crossflow filtration system such as to reduce the determined control deviation.

In yet another aspect, a computer program product is provided which may be tangibly embodied in an electronic signal or a physical storage medium and which comprises program code which when loaded in a computer system and executed by the computer system causes that computer system to perform a control method for automated controlling of a crossflow filtration system as described herein preferably in accordance with one of the described preferred embodiments of the invention These and other objects, features and advantages of the present invention will become more apparent upon reading of the following detailed description of preferred embodiments and accompanying drawings. It should be understood that even though embodiments are separately described, single features thereof may be combined to additional embodiments.

Figure 1:
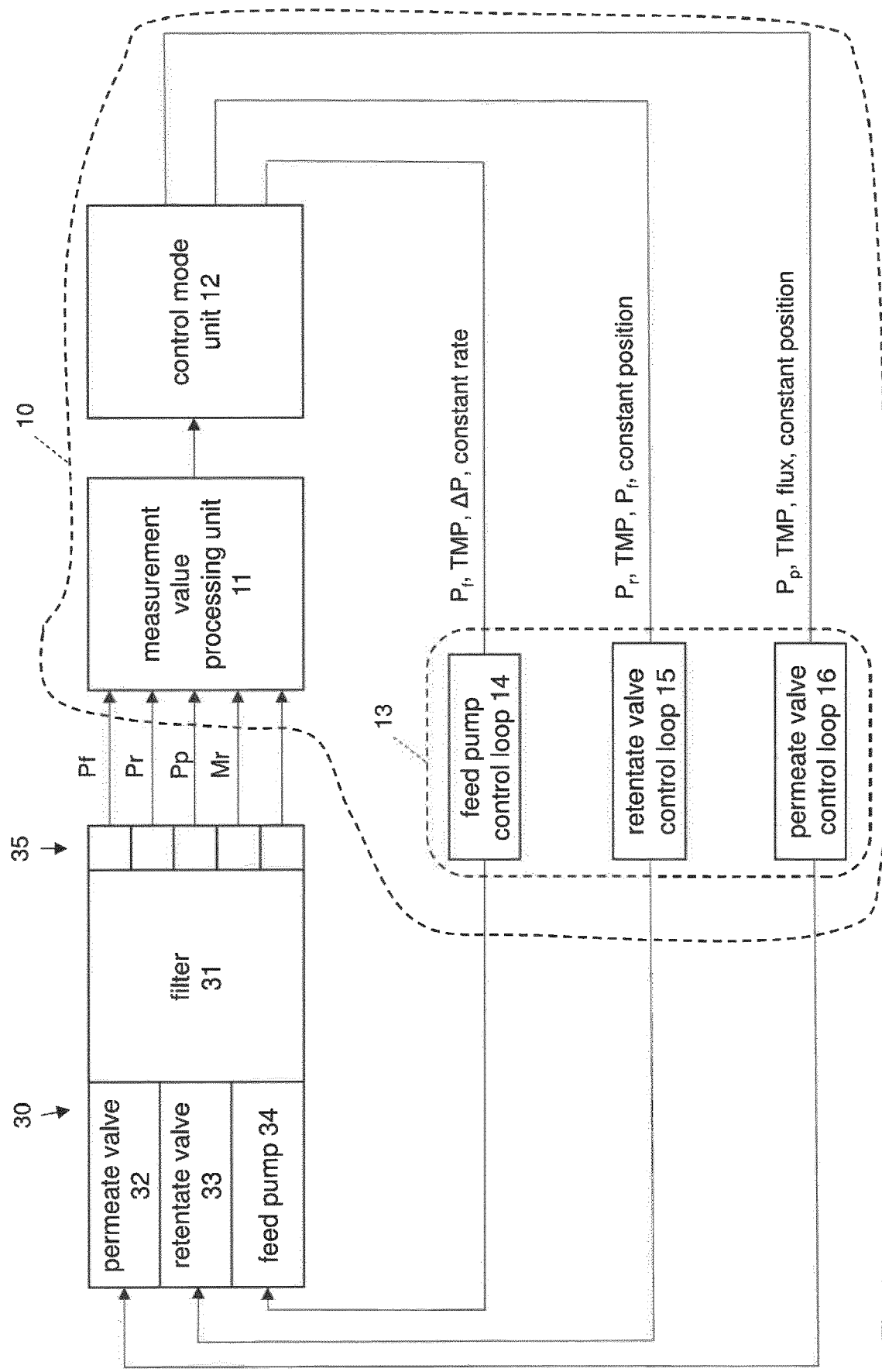
FIG. 1 shows a schematic illustration of the control system connected to a CFF system according to an embodiment.

FIG. 1 shows a schematic illustration of a control system 10 connected to a CFF system 30 according to a particular embodiment of the present invention. The CFF system 30 is configured to process, e. g., fluids, emulsions, suspensions, beverages, such as water, juice, beer, wine, whey, milk, sewage and/or solutions, e.g., for biotechnological, pharmaceutical, biopharmaceutical, biogenetic, medical, chemical, cosmetic and/or laboratory applications. It should be understood that the type and design of the crossflow filtration system is not limited. It is preferably designed for microfiltration, ultrafiltration, nanofiltration, pervaporation and/or reverse osmosis applications. The crossflow filtration system may be designed for the filtration of solid and/or gaseous media.

The CFF system 30 comprises at least one membrane (as a filter 31) and a retentate vessel (not shown) for the retentate from the medium to be filtered,. In the CFF process, the medium to be filtered from the feed vessel is substantially tangentially passed across the filter membrane, which is arranged inside the filter 31, particularly at positive pressure relative to the permeate side. A proportion of the material which is smaller than the membrane pore size passes through the membrane as permeate or filtrate and is collected in a permeate vessel (not shown), while the remainder is retained on the feed side of the membrane as retentate and collected in the retentate vessel. Accordingly, in the crossflow filtration the substantially tangential motion of the bulk of the fluid across the membrane causes trapped or retained particles on the filter surface to be separated or rubbed off. In order to regulate the flow circuitry of the CFF system 30 a plurality of actors are included. A permeate valve 32 is configured to regulate the flow through a permeate conduit extending from an outlet on the permeate side to an inlet of the permeate vessel. A retentate valve 33 is configured to regulate the flow through a retentate conduit extending from an outlet on the retentate side of the filter 31 to an inlet of the retentate vessel. A feed pump 34 is configured to drive the flow within the CFF system 30. The feed pump 34 is arranged in a feed conduit extending from an outlet of the retentate vessel to an inlet of the filter 31. A plurality of sensors 35 are provided to the CFF system 30 in measure quantities of interest. In particular, the CFF system 30 comprises a feed pressure sensor, a retentate pressure sensor, a permeate pressure sensor and a mass sensor for the retentate vessel. The feed pressure sensor measures the pressure $P_f$ of a feed stream that flows within the feed conduit. The retentate pressure sensor measures the pressure $P_r$ of a retentate stream that flows within the retentate conduit. The permeate pressure sensor measures the pressure $P_p$ of a permeate stream that flows within the permeate conduit. The mass sensor measures the mass of the retentate vessel and may be, e.g., a weighing device such as a balance or a load cell.

The control system 10 comprises measurement value processing unit 11, a control mode selection unit 12, a control unit 13, a feed pump control loop 14, a retentate valve control loop 15, a permeate valve control loop 16. Connections between the single units of the control system 10 and connections from the control system 10 to the CFF system 30 are preferably electrical connections.

The measurement value processing unit 11 receives sensor signals from the plurality of sensors 35 of the CFF system 30. The sensor signals are preferably acquired via one or more analog-digital converters that are preferably part of the measurement value processing unit 11. Based on the received sensor signals the measurement value processing unit provides a plurality of process parameters to the control mode selection unit 12. The process parameters may comprise the raw sensor signals, filtered sensor signals and process parameters being derived from raw and/or filtered sensor signals. Filtered sensor signals can be generated by the measurement value processing unit 11 by applying data filter methods to one or more raw sensor signals, such as low-pass, high-pass, band-pass, band-stop, band-reject and/or notch filtering. Process parameters being derived may be calculated from one or more raw sensor signals and/or filtered sensor signals and/or known system parameters. The plurality of process parameters defines an operation state of the CFF system 30. In a normal operation state, the magnitudes of the process parameters are in a desired range. In an abnormal operation state the magnitude of at least one process parameter is not in the desired range anymore.

The control mode selection unit 12 determines a control mode based on a user input. Preferably an interface is provided to the control mode selection unit 12, e.g., a touchscreen and/or a display combined with a keyboard and/or buttons. The user mays select for each control loop 14, 15, 16 a control parameter. A control parameter is a process parameter to be controlled by the respective loop. As described later a certain selection of process parameters is preferably available for the respective control loops 14, 15, 16. Depending on the selected control parameters a control mode is defined. Alternatively, the user may select predefined control modes having a predefined selection of control parameters. Preferably, the control mode selection unit may determine control modes that correspond to an X marked mode in Table 1. After the control mode is determined, the control mode selection unit 12 determines for each control parameter a set value. The set value may be taken from an internal database and/or memory of control system and/or defined by another user input.

The control unit 13 operates in the determined control mode. Therefore, the control unit 13 is provided with the control parameters of the determined control mode and the respective set values. The control unit 13 is capable of affecting the operation state of the CFF system 13 via the control loops 14, 15, 16 by providing control signals to the actuators 32, 33, 34.

The feed pump control loop 14 provides a control signal for the feed pump 34 resulting in a specific feed pumping rate. For loop 14 following control parameters are available: $P_f$, TMP, $\Delta P$, constant pumping rate. If a constant pumping rate is selected, loop 14 provides a control signal for the feed pump 34 resulting in a constant feed pumping rate. The constant pumping rate to be achieved corresponds to the determined set value for this control parameter. In case the control parameter is one of $P_f$, TMP and $\Delta P$, the control signal may cause a changing pumping rate in order to hold the control parameter at its determined set value.

The retentate valve control loop 15 provides a control signal for the retentate valve 33 resulting in a specific retentate valve flow rate. For loop 15 following control parameters are available: $P_r$, TMP, $\Delta P$, constant position. If a constant position is selected, loop 15 provides a control signal for the retentate valve 33 resulting in a constant retentate valve flow rate. The constant position to be achieved corresponds to the determined set value for this control parameter. In case the control parameter is one of $P_r$, TMP and $\Delta P$, the control signal may cause a retentate valve flow rate in order to hold the control parameter at its determined set value.

The permeate valve control loop 16 provides a control signal for the permeate valve 32 resulting in a specific permeate valve flow rate. For loop 16 following control parameters are available: $P_p$, TMP, $\Delta P$, flux, constant position. If a constant position is selected, loop 16 provides a control signal for the permeate valve resulting in a constant permeate valve flow rate. The constant position to be achieved corresponds to the determined set value for this control parameter. In case the control parameter is one of $P_p$, TMP, $\Delta P$ and flux the control signal may cause a retentate valve flow rate in order to hold the control parameter at its determined set value.

The control system 30 may comprise further control loops that are configured to control further actuators that may be arranged in the CFF system 30.

Figure 2:
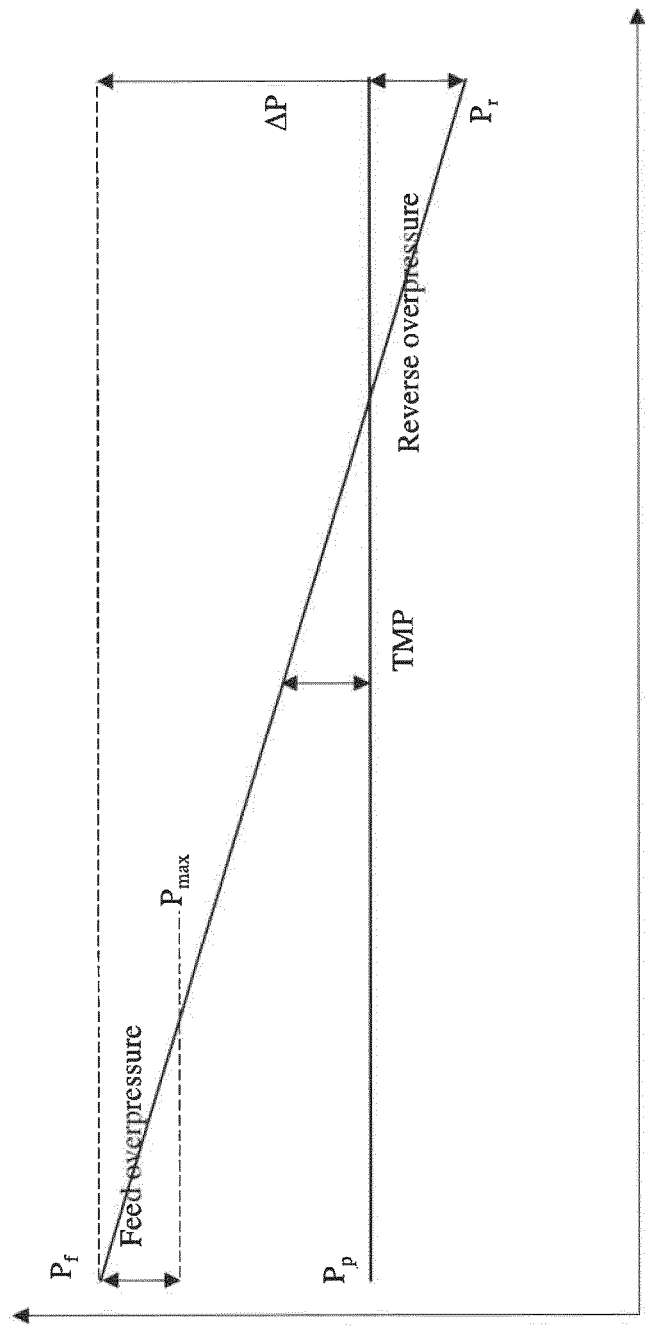
FIG. 2 shows a diagram of overpressure conditions.

FIG. 2 shows a diagram of overpressure conditions. The vertical axis represents the magnitude of pressure and the horizontal axis represents the length of a crossflow filter membrane. $P_p$ can be regarded as substantially constant along the membrane. A pressure gradient $\Delta P$ exists along the membrane and is defined by the pressure difference between the feed pressure $P_f$ and retentate pressure $P_r$. TMP represents the difference between $P_p$ and the mean value of $\Delta P$. Feed overpressure occurs, if $P_f$ rises above a certain limit $P_{max}$. Reverse overpressure occurs, if $P_r$ drops below $P_p$.

Figure 3:
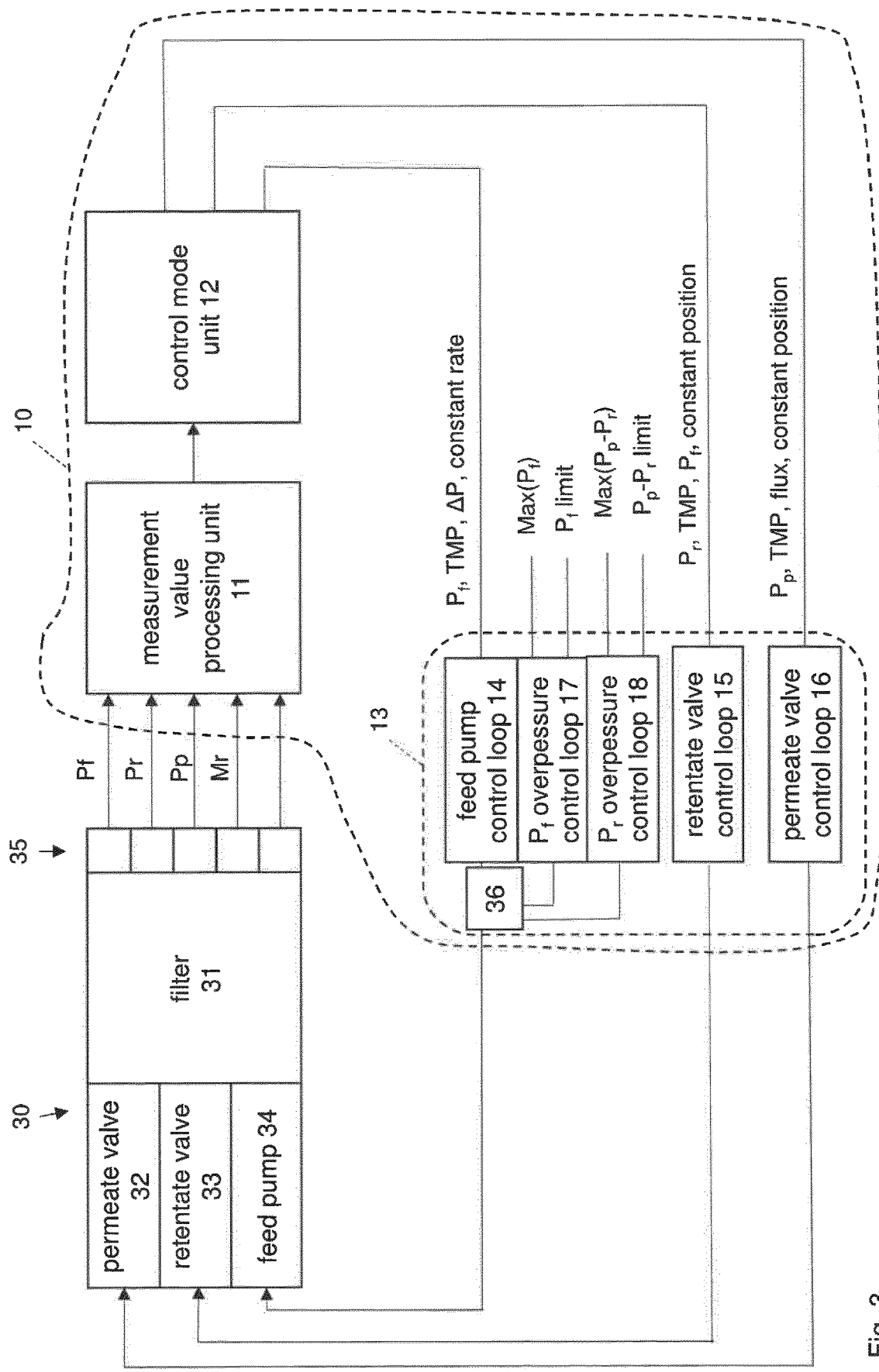
FIG. 3 shows a schematic illustration of the control system connected to a CFF system including $P_f$ and $P_r$ overpressure prevention functions according to an embodiment.

FIG. 3 shows a schematic illustration of a control system 10 connected to a CFF system 30 including the $P_f$ and $P_r$ overpressure prevention functions according to an embodiment of the present invention. The arrangement and function of the control system 10 and the CFF system 30 are similar to those shown in the embodiment of FIG. 1. Additionally, the control unit 13 comprises a $P_f$ and $P_r$ overpressure control loop in order to protect the CFF system 30 from detrimental feed and/or reverse overpressure.

The $P_f$ overpressure control loop 17 (first secondary feed pump control loop) uses as input the last local maximum of the $P_f$ sensor signal and a value for the $P_f$ limit. If the last local maximum of the $P_f$ sensor signal exceeds the $P_f$ limit, the feed overpressure condition is fulfilled and the CFF system 30 is in an abnormal operation state. At this moment, the feed pump control loop 14 (primary feed pump control loop) stops providing control signals to the feed pump 34 and the $P_f$ overpressure control loop 17 takes over controlling the feed pump 34. This selection of the desired feed pump actuating signal is performed by an overpressure prevention unit 36. The $P_f$ overpressure control loop preferably decreases the feed pumping rate, and stops the feed pump if filter blockage occurs. When the CFF system 30 is again in a normal operation state, the feed pump control loop 14 controls again the feed pump 34 due to a respective selection made by the overpressure prevention unit 36.

The $P_r$ overpressure control loop (second secondary feed pump control loop) 18 uses as input the last local maximum of the pressure difference between the $P_p$ sensor signal and the $P_r$ sensor signal. If the last local maximum of this pressure difference drops below a predetermined value (e.g. 0), the reverse overpressure condition is fulfilled and the CFF system 30 is in an abnormal operation state. At this moment, the feed pump control loop 14 (primary feed pump control loop) stops providing control signals to the feed pump 34 and the $P_r$ overpressure control loop 18 takes over controlling the feed pump 34. When the CFF system 30 is again in a normal operation state, the feed pump control loop 14 controls again the feed pump 34.

Even though FIG. 3 shows only one of filter 31, this embodiment may be implemented as a multi-channel filtration system comprising multiple filters 31, and preferably also multiple sensors 35 and actuators 32-34 assigned to the respective channels, such that the multiple channels can be operated (at least part) independent from each other. However, further preferably, the overpressure prevention function may couple the various channels as described in more detail above.

Figure 4:
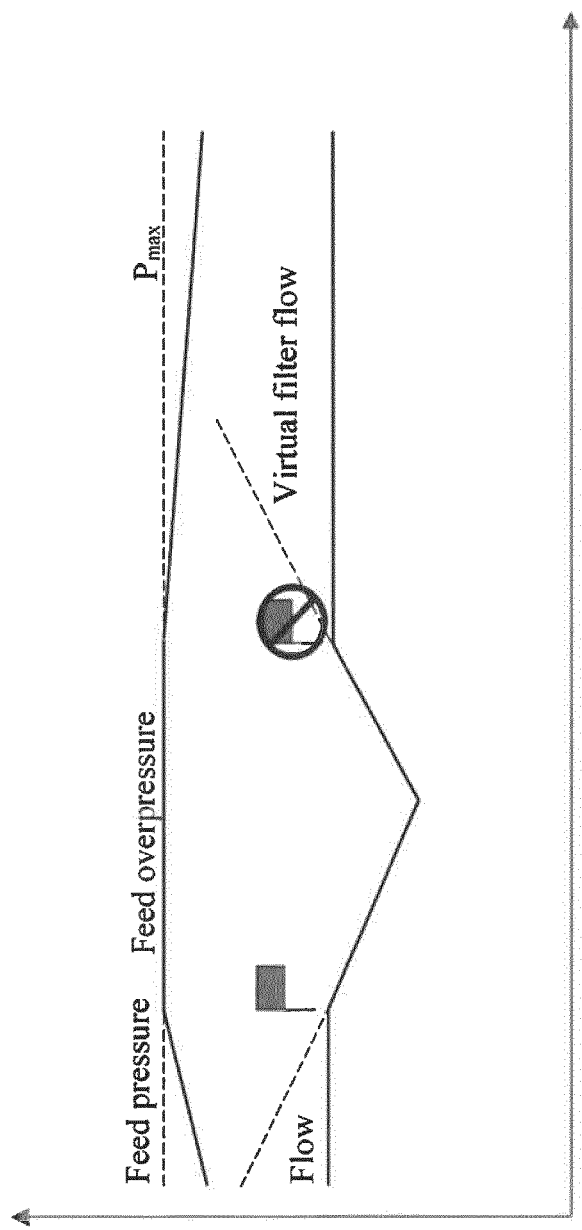
FIG. 4 shows a diagram a feed overpressure prevention function according to an embodiment.

FIG. 4 shows a diagram of a feed overpressure prevention function according to an embodiment. A feed overpressure prevention function may follow an algorithm that attains the timelines shown in FIG. 4. The algorithm may define an overpressure prevention control loop controlling a virtual filter. Role of the virtual filter is to behave as if it is experiencing overpressure condition and model what flow rate is required for the feed overpressure to occur. In a normal operation of CFF system, the virtual filter will produce a flow rate that is significantly larger than the real flow rate and thus they preferably do not affect any other control loops. Once filter starts approaching overpressure condition, virtual filter operational parameters begin to approach those of the real filter under control by a respective primary control loop. At the moment of overpressure onset virtual filter and real one behave identically, and at this point two things occur: first, the primary control loop relinquishes control of the real filter to the overpressure prevention control loop; second, flag is raised informing the control system that an feed overpressure event occurred. If the user setup specific actions to do something about feed overpressure, then those actions are taken; otherwise, the control system will continue to try to prevent overpressure all the way to stopping feed pump if complete filter blockage occurs. Reverse overpressure prevention may work in an analogous manner, except for obvious modifications to the model to reflect reverse overpressure instead of feed overpressure condition. Advantages of the described overpressure prevention functions are that it is smooth and does not induce pressure or flow spikes that might be damaging. It does not cause loss of material and is completely recoverable barring complete failure of the filter.

The vertical axis of FIG. 4 represents the magnitude of a feed pressure and feed flow, respectively. The horizontal axis represents time. It can be seen how feed overpressure slowly rises to reach the maximum pressure. Simultaneously the virtual filter flow is coming down to meet the real filter flow. Once maximum pressure is reached the flow gets depressed by the virtual filter to prevent further increases of the feed pressure. Also, a flag is raised to indicate the feed overpressure condition. Once mitigating action is taken, e.g. addition a buffer medium, overpressure condition subsides and the CFF system returns to a normal operation. At this point the flag is dropped.

LIST OF REFERENCE NUMERALS

10 control system
11 measurement value processing unit
12 control mode selection unit
13 control unit
14 (primary) feed pump control loop
15 retentate valve control loop
16 permeate valve control loop
17 $P_f$ overpressure control loop (secondary feed pump control loop)
18 $P_r$ overpressure control loop
30 CFF system
31 filter
32 permeate valve
33 retentate valve
34 feed pump
35 sensors
36 overpressure prevention unit

The invention claimed is:

1. A computerized control system for automated controlling of a crossflow filtration system, comprising:
   one or more computer-readable storage media having a plurality of control modes stored thereon;
   a measurement value processing unit configured to:
   receive a plurality of sensor signals from a plurality of sensors of the crossflow filtration system; and determine a plurality of process parameters defining an operation state of the crossflow filtration system based on the plurality of sensor signals;

a control mode selection unit configured to:
determine, based on data indicative of a selected control mode of the plurality of control modes, a subset of the plurality of process parameters as a set of control parameters; and
determine, for each control parameter in the set of control parameters, a corresponding set value; and a control unit comprising a plurality of control loop modules, each control loop module of the plurality of control loop modules being configured to:
receive at least one control parameter from the set of control parameters;
determine a control deviation of the received control parameter from the corresponding set value; and
control actuation of at least one of one or more actuators the one or more of the crossflow filtration system to change the operation state of the crossflow filteration system such as to reduce the determined control deviation, wherein the measurement value processing unit is configured to:
receive at least one pressure signal indicating a pressure in a fluid stream of the crossflow filtration system, wherein the at least one pressure signal comprises one or more of a feed pressure signal, a retentate pressure signal, or a permeate pressure signal;
determine at least one overpressure prevention condition from the at least one received pressure signal based on at least one of the feed pressure signal or a pressure difference between the permeate pressure signal and the retentate pressure signal; and
determine a local maxima based at least on the at least one overpressure prevention condition;

wherein the control mode selection unit is configured to:
determine a primary control parameter, the primary control parameter comprising at least one of the feed pressure signal, a pressure difference between the feed pressure signal and the retentate pressure signal, or a transmembrane pressure of the crossflow filtration system;
determine at least one secondary control parameter, the at least one secondary control parameter comprising the determined local maxima; and
determine a primary set value and at least one secondary set value for the primary control parameter and the at least one secondary control parameter, respectively; and wherein the plurality of control loop modules comprises a first feed pump control loop module, the first feed pump control loop module comprising:
a primary feed pump control loop configured to:
receive the primary control parameter;
determine a primary control deviation of the received primary control parameter from the primary set value; and
determine a primary feed pump actuating value for controlling a feed pump actuator to change operation of a feed pump of the crossflow filtration system to reduce the determined primary control deviation;

at least one secondary feed pump control loop configured to:
receive the at least one secondary control parameter;
determine at least one secondary control deviation of the received at least one secondary control parameter from the at least one secondary set value; and
determine at least one secondary feed pump actuating value for controlling the feed pump actuator to change the operation of the feed pump of the crossflow filtration system to reduce the determined at least one secondary control deviation; and wherein the control unit further comprises an overpressure prevention unit configured to:
select one of the primary feed pump actuating value or the at least one secondary feed pump actuating value that corresponds to a lower feed flow rate relative to the other of the primary feed pump actuating value or the at least one secondary feed pump actuating value; and
control the feed pump actuator based at least on the selected one of the primary feed pump actuating value or the at least one secondary feed pump actuating value corresponding to the lower feed flow rate.

2. The computerized control system according to claim 1, wherein the primary feed pump control loop and the at least one secondary feed pump control loop each comprises a PID controller, each of the primary feed pump control loop and the at least one secondary feed pump control loop having a same set of PID-parameters.

3. The computerized control system according to claim 1, which is adapted for automated controlling of a multi-channel crossflow filtration system, wherein the control mode selection unit is configured to:
identify a first overpressure condition in a forerunner filtration channel of the multi-channel crossflow filtration system, and
determine the at least one secondary set value for a follower filtration channel of the multi-channel crossflow filtration system.

4. The computerized control system according to claim 1, wherein the plurality of sensor signals comprises one or more of:
the feed pressure signal indicating a pressure in a feed stream of the crossflow filtration system;
the retentate pressure signal indicating a pressure in a retentate stream of the crossflow filtration system;
the permeate pressure signal indicating a pressure in a permeate stream of the crossflow filtration system;
a weight signal indicating a mass of a retentate vessel of the crossflow filtration system; or
a flow signal of a feed flow of the crossflow filtration system.

5. The computerized control system according to claim 1, wherein the plurality of process parameters comprises one or more of:
the plurality of sensor signals;
the transmembrane pressure of the crossflow filtration system;
the pressure difference between the feed pressure signal, indicating a pressure in a feed stream of the crossflow filtration system, and the retentate pressure signal, indicating a pressure in a retentate stream of the crossflow filtration system; or
a permeate flow rate, indicating a flow rate through a filter membrane of the crossflow filtration system, wherein preferably the permeate flow rate F is determined according to $$F = L - \frac{dM}{dt} * \frac{1}{\rho}$$

with a change of a measured retentate mass M over time t, a retentate density p, and a flow rate L of a diafiltration buffer added to a retentate in the crossflow filtration system.

6. The computerized control system according to claim 1, wherein the plurality of control loop modules comprises a second feed pump control loop configured to control the feed pump actuator of the crossflow filtration system,
wherein the control mode selection unit is configured to selectively provide as a control parameter to the second feed pump control loop one or more of:
the feed pressure signal indicating a pressure in a feed stream of the crossflow filtration system;
the pressure difference between the feed pressure signal and the retentate pressure signal the retentate pressure signal indicating a pressure in a retentate stream of the crossflow filtration system; or
the transmembrane pressure of the crossflow filtration system.

7. The computerized control system according to claim 1, wherein the plurality of control loop modules comprises a retentate valve control loop configured to provide a retentate valve actuating signal for a retentate valve actuator of the crossflow filtration system,
wherein the control mode selection unit is configured to selectively provide as a control parameter to the retentate valve control loop one or more of:
the retentate pressure signal indicating a pressure in a retentate stream of the crossflow filtration system;
the transmembrane pressure of the crossflow filtration system; or
the feed pressure signal indicating a pressure in a feed stream of the crossflow filtration system.

8. The computerized control system according to claim 1, wherein the plurality of control loop modules comprises a permeate valve control loop configured to provide a permeate valve actuating signal for a permeate valve actuator of the crossflow filtration system,
wherein the control mode selection unit is configured to selectively provide as a control parameter to the permeate valve control loop one or more of:
the permeate pressure signal indicating a pressure in a permeate stream of the crossflow filtration system;
the transmembrane pressure of the crossflow filtration system; or
a permeate flow rate indicating a flow rate through a filter membrane of the crossflow filtration system.

9. A computerized crossflow filtration system, comprising:
a first actuator of the one or more actuators, the first actuator comprising the feed pump actuator to provide fluid through a feed channel to a filter of the crossflow filtration system, wherein a feed pressure sensor is provided to measure a fluid pressure in the feed channel;
a second actuator of the one or more actuators, the second actuator comprising a retentate valve actuator to control flow of retentate fluid through a retentate channel from the filter of the crossflow filtration system, where a retentate pressure sensor is provided to measure a fluid pressure in the retentate channel;
a third actuator of the one or more actuators, the third actuator comprising a permeate valve actuator to control flow of permeate fluid through a permeate channel from the filter of the crossflow filtration system, where a permeate pressure sensor is provided to measure a fluid pressure in the permeate channel; and
the computerized control system according to claim 1.

10. The crossflow filtration system according to claim 9, further comprising a weight sensor to measure a weight or mass of a retentate vessel of the crossflow filtration system.

11. A multi-channel crossflow filtration system, comprising:
a plurality of filtration channels;
at least one first actuator of the one or more actuators, the least one first actuator comprising the feed pump actuator to provide fluid through a feed channel to a filter of the crossflow filtration system, wherein a feed pressure sensor is provided to measure a fluid pressure in the feed channel;
at least one second actuator of the one or more actuators, the at least one second actuator comprising a retentate valve actuator to control flow of retentate fluid through a retentate channel from the filter of the crossflow filtration system, where a retentate pressure sensor is provided to measure a fluid pressure in the retentate channel;
at least one third actuator of the one or more actuators, the at least one third actuator comprising a permeate valve actuator to control flow of permeate fluid through a permeate channel from the filter of the crossflow filtration system, where a permeate pressure sensor is provided to measure a fluid pressure in the permeate channel; and
the computerized control system according to claim 3, which is adapted to:
operate at least one of the plurality of filtration channels as the forerunner filtration channel to determine the first overpressure condition from said forerunner filtration channel; and
operate at least another one of the plurality of filtration channels as the follower filtration channel to determine the at least one secondary set value for the follower filtration channel.

12. A control method for automated controlling of a crossflow filtration system via a computerized control system comprising a computer-readable storage media having a plurality of control modes stored thereon, a measurement value processing unit comprising an interface for communication with a plurality of sensors of the crossflow filtration system, and a control unit configured for communication with one or more actuators of the crossflow filtration system and including an overpressure prevention unit, the control method comprising:
receiving, at the measurement value processing unit, a plurality of sensor signals from the plurality of sensors of the crossflow filtration system;
determining a plurality of process parameters defining an operation state of the crossflow filtration system based on the plurality of sensor signals;
determining, based on data indicative of a selected control mode of the plurality of control modes, a subset of the plurality of process parameters as a set of control parameters;
determining for each control parameter in the set of control parameters a corresponding set value;

determining, for each control parameter in the set of control parameters, a control deviation of the control parameter from the corresponding set value;

controlling, via the control unit, actuation of at least one of the one or more actuators of the crossflow filtration system to change the operation state of the crossflow filtration system such as to reduce the determined control deviation;

receiving, at the measurement value processing unit, at least one pressure signal indicating a pressure in a fluid stream of the crossflow filtration system, the at least one pressure signal comprising one or more of a feed pressure signal, a retentate pressure signal, or a permeate pressure signal;

determining at least one overpressure prevention condition from the at least one received pressure signal, the at least one overpressure prevention condition being determined from at least one of the feed pressure signal or a pressure difference between the permeate pressure signal and the retentate pressure signal;

determining a local maxima based at least on the at least one overpressure prevention condition;

determining a primary control parameter, the primary control parameter comprising one or more of the feed pressure signal, a pressure difference between the feed pressure signal and the retentate pressure signal, or a transmembrane pressure of the crossflow filtration system;

determining at least one secondary control parameter, the at least one secondary control parameter comprising the determined local maxima;

determining a primary set value and at least one secondary set value for the primary control parameter and the at least one secondary control parameter, respectively;

determining a primary control deviation of the primary control parameter from the primary set value;

determining a primary feed pump actuating value for controlling for a feed pump actuator to change operation of a feed pump of the crossflow filtration system such as to reduce the determined primary control deviation;

determining at least one secondary control deviation of the at least one secondary control parameter from the at least one secondary set value;

determining at least one secondary feed pump actuating value for controlling the feed pump actuator to change the operation of the feed pump of the crossflow filtration system such as to reduce the determined at least one secondary control deviation;

selecting, via the overpressure prevention unit, one of the primary feed pump actuating value or the at least one secondary feed pump actuating value that corresponds to a lower feed flow rate relative to the other of the primary feed pump actuating value or the at least one secondary feed pump actuating value; and controlling the feed pump actuator based at least on the selected one of the primary feed pump actuating value or the at least one secondary feed pump actuating value corresponding to the lower feed flow rate.

13. The computerized control system according to claim 1, wherein the determination of the at least one overpressure prevention condition from the at least one received pressure signal is based at least on the pressure difference between the permeate pressure signal and the retentate pressure signal.

14. The computerized control system according to claim 1, wherein the measurement value processing unit comprises an interface for communication with the plurality of sensors of the crossflow filtration system.

15. The computerized control system according to claim 1, wherein the control unit comprises an interface for communication with the one or more actuators of the crossflow filtration system.

16. The computerized control system according to claim 1, wherein the one or more computer-readable storage media further has computer-executable instructions stored thereon for carrying out respective operations of each of the measurement value processing unit, the control mode selection unit, and the control unit.

17. The control method according to claim 12, wherein the determining of the at least one overpressure prevention condition from the at least one received pressure signal is based at least on the pressure difference between the permeate pressure signal and the retentate pressure signal.

* * * * *

UNITED STATES PATENT AND TRADEMARK OFFICE
CERTIFICATE OF CORRECTION

| | | |
|---|---|---|
| PATENT NO. | : 11,896,931 B2 | |
| APPLICATION NO. | : 16/753748 | |
| DATED | : February 13, 2024 | |
| INVENTOR(S) | : Magazov et al. | |

It is certified that error appears in the above-identified patent and that said Letters Patent is hereby corrected as shown below:

In the Claims

Column 19, Lines 19, Claim 1 "control actuation of at least one of one or more actuators the one or more of the crossflow filtration system" should read --control actuation of at least one of the one or more actuators of the crossflow filtration system--

Signed and Sealed this
Twelfth Day of November, 2024

Katherine Kelly Vidal
*Director of the United States Patent and Trademark Office*